United States Patent
Romanato et al.

(10) Patent No.: US 10,954,400 B2
(45) Date of Patent: Mar. 23, 2021

(54) WATER-BASED PRINTING INK COMPRISING AN AQUEOUS DISPERSED POLYURETHANE BINDER AND AN AQUEOUS DISPERSED POLY(METH)ACRYLATE BINDER

(71) Applicant: BASF SE, Ludwigshafen am Rhein (DE)

(72) Inventors: Paola Romanato, Frick (CH); Bernd Reck, Gruenstadt (DE); Karl Haeberle, Speyer (DE); Kristina Georgieva, Mannheim (DE); Arjan Termaten, GC Assen (NL); Steven Zijlstra, NA Zwolle (NL); Wouter Toutenhoofd, DB Heerenveen (NL)

(73) Assignee: BASF SE, Ludwigshafen am Rhein (DE)

( * ) Notice: Subject to any disclaimer, the term of this patent is extended or adjusted under 35 U.S.C. 154(b) by 648 days.

(21) Appl. No.: 15/735,803

(22) PCT Filed: Jun. 8, 2016

(86) PCT No.: PCT/EP2016/062940
§ 371 (c)(1),
(2) Date: Dec. 12, 2017

(87) PCT Pub. No.: WO2016/202654
PCT Pub. Date: Dec. 22, 2016

(65) Prior Publication Data
US 2020/0040203 A1    Feb. 6, 2020

(30) Foreign Application Priority Data
Jun. 18, 2015 (EP) .................... 15172708

(51) Int. Cl.
| | | |
|---|---|---|
| *C09D 11/102* | (2014.01) |
| *C08F 220/18* | (2006.01) |
| *C08G 18/08* | (2006.01) |
| *C08G 18/18* | (2006.01) |
| *C08G 18/22* | (2006.01) |
| *C08G 18/32* | (2006.01) |
| *C08G 18/40* | (2006.01) |
| *C08G 18/42* | (2006.01) |
| *C08G 18/48* | (2006.01) |
| *C08G 18/66* | (2006.01) |
| *C08G 18/75* | (2006.01) |
| *C09D 11/107* | (2014.01) |

(52) U.S. Cl.
CPC .......... *C09D 11/102* (2013.01); *C08F 220/18* (2013.01); *C08G 18/0823* (2013.01); *C08G 18/1808* (2013.01); *C08G 18/227* (2013.01); *C08G 18/3206* (2013.01); *C08G 18/3218* (2013.01); *C08G 18/4018* (2013.01); *C08G 18/42* (2013.01); *C08G 18/4804* (2013.01); *C08G 18/6674* (2013.01); *C08G 18/755* (2013.01); *C09D 11/107* (2013.01); *C08F 220/1804* (2020.02)

(58) Field of Classification Search
CPC ..... C09D 11/00; C09D 11/102; C09D 11/107; C08F 220/18; C08F 220/1804; C08G 18/0823; C08G 18/1808; C08G 18/227; C08G 18/3206; C08G 18/3218; C08G 18/4018; C08G 18/42; C08G 18/4804; C08G 18/6674; C08G 18/755
See application file for complete search history.

(56) References Cited

U.S. PATENT DOCUMENTS

| | | | | |
|---|---|---|---|---|
| 5,231,130 A | * | 7/1993 | Wallon ..................... | C08K 3/22 524/500 |
| 5,541,251 A | * | 7/1996 | Bontinck ............ | C09D 133/062 524/501 |
| 2002/0040098 A1 | * | 4/2002 | Maekawa ............. | C08L 51/006 525/88 |
| 2002/0157773 A1 | * | 10/2002 | Kawai ..................... | B32B 27/36 156/244.16 |
| 2004/0167252 A1 | | 8/2004 | Melchiors et al. | |
| 2004/0249018 A1 | * | 12/2004 | Kataoka ................. | C09D 11/30 523/160 |
| 2006/0100306 A1 | | 5/2006 | Yau et al. | |
| 2006/0149020 A1 | * | 7/2006 | Mayer ................ | C08G 18/4018 528/44 |
| 2014/0135442 A1 | * | 5/2014 | Billiani ............. | C08G 18/7642 524/504 |

FOREIGN PATENT DOCUMENTS

| | | | |
|---|---|---|---|
| CN | 104151561 A | | 11/2014 |
| JP | 2013234214 A | * | 11/2013 |
| WO | 2009023520 A1 | | 2/2009 |
| WO | 2012140175 A1 | | 10/2012 |
| WO | 2014072302 A1 | | 5/2014 |
| WO | 2015107078 A1 | | 7/2015 |

OTHER PUBLICATIONS

Machine Translation of JP 2013-234214 (Year: 2013).*
Machine Translation of CN 104151561A (Year: 2014).*
International Search Report and Written Opinion for International Application No. PCT/EP2016/062940, dated Aug. 24, 2016, 9 pages.

* cited by examiner

*Primary Examiner* — Lucas A Stelling
*Assistant Examiner* — Sathavaram I Reddy
(74) *Attorney, Agent, or Firm* — Armstrong Teasdale LLP

(57) ABSTRACT

Provided herein is a printing ink comprising at least two binders, at least one pigment, an aqueous carrier, and optional additives, wherein one binder is a specific polyurethane dispersion binder and a further binder is a specific poly(meth)acrylate dispersion binder.

20 Claims, No Drawings

WATER-BASED PRINTING INK COMPRISING AN AQUEOUS DISPERSED POLYURETHANE BINDER AND AN AQUEOUS DISPERSED POLY(METH)ACRYLATE BINDER

CROSS-REFERENCE TO RELATED APPLICATIONS

This application is the national stage entry of PCT/EP2016/062940, filed on Jun. 8, 2016, which claims the benefit of priority to European Patent Application No. 15172708.8, filed Jun. 18, 2015, which is incorporated by reference in its entirety herein.

FIELD OF THE INVENTION

The present invention relates to a printing ink, in particular to a lamination printing ink, comprising at least two binders, at least one pigment, an aqueous carrier and optional additives, wherein one binder is a specific aqueous polyurethane dispersion binder and a further binder is a specific poly(meth)acrylate dispersion binder. The invention also relates to printed laminates printed with said ink and methods of making said laminates.

BACKGROUND

Packagings such as packagings for food often comprise printed film laminates made of two or more polymeric films which are laminated together and wherein the printing ink resides between two laminated films. Typically, when preparing packaging intended to be used to package food products, a film is printed on one side, adhesive is applied on top of the printing as well as on the clear areas surrounding the printing, and then the film is laminated to a second film at a laminating nip. In in-line printing, the adhesive is coated on top of the freshly printed ink or the opposite web and immediately thereafter is laminated. In many cases, lamination is accomplished "out of line", meaning that a printed roll is taken to another location for lamination. The adhesive must bond to the ink as well as to the film without causing the ink to bleed, run, delaminate, or generate poor bond strength.

Printing inks which are suitable for making printed laminates via roll printing process (hereinafter referred to as "lamination inks") face a variety of desired requirements:
high compatibility with pigments in the liquid ink
blocking behavior of the printed film as low as possible
high lamination bond strength of the film laminates, also in case of multiple printing
high re-solubility of ink which has temporarily dried on the printing rolls Especially, a coagulation or flocculation of ink ingredients should be avoided. In cases, where lamination is accomplished "off-line" it is important that a printed film is blocking resistant before lamination, i.e. that the printed surface of the film is not sticky and does not adhere to other printed or non-printed film surface areas, especially to the back-side when the film is rolled on a reel directly after the printing process.

High lamination bond strength is especially critical and difficult to achieve in multiple print laminate wherein a second print or further prints are applied on a first print, e.g. a white print is applied on top of a previous colored, non-white print.

Intended or unintended interruptions can occur during the roll printing process. The ink on the printing roll cylinders can become touch dry during these interruptions. Therefore, it is important that the dried ink on the printing equipment re-dissolves quickly in the liquid printing ink stock when the printing process is resumed.

For workplace hygiene and safety reasons it is desired to provide printing inks with no no organic solvents.

WO 2009/023520 discloses lamination inks comprising aqueous polyurethane binders with good lamination bond strength on various substrates. The balance of properties in respect to ink resolubility, lamination bond strength and blocking resistance could be further improved. The difficulty is that these properties typically show opposing trends. Higher lamination bond strength is often associated with high blocking, i.e. poor blocking resistance. Good ink resolubility (e.g. due to more polar components) is often associated with lower lamination bond strength.

DESCRIPTION

It is an object of the invention to further optimize water-based printing inks, in particular water based lamination printing inks, in respect to an improved balance of ink resolubility, lamination bond strength and blocking resistance, especially concerning improved ink resolubility and lamination bond strength while maintaining acceptable blocking resistance.

The invention provides a water based printing ink comprising at least two binders, at least one pigment, an aqueous carrier and optional additives, wherein at least one binder is a polyurethane dispersion binder and at least one binder is a poly(meth)acrylate dispersion binder,
wherein the polyurethane is made of components comprising:
a) at least one diisocyanate,
b) at least one diol having number average molecular weight of from 500 to 5000 g/mol,
c) at least one mono-hydroxy functional compound having a number average molecular weight of from 500 to 5000 g/mol,
d) optionally at least one polyfunctional compound having at least three NCO-groups or having at least three NCO-reactive groups,
e) optionally at least one diamine having no acid groups,
f) optionally at least one compound having at least one NCO-reactive group and at least one ionic or ionizable group,
g) optionally one or more polyol compounds having a number average molecular weight of less than 500 g/mol, preferably from 60 to 490 g/mol;
and wherein the poly(meth)acrylate polymer has a glass transition temperature between −20 and +40° C., preferably from −10 to +35° C. and is prepared by polymerization, preferably by aqueous emulsion polymerization, of components comprising:
h) at least one vinyl monomer selected from the group consisting of acrylates, methacrylates and styrene,
i) from 0.1 to 4 wt % of one or more vinyl monomers with an acid group, preferably (meth)acrylic acid,
j) optionally up to 5 wt. % of one or more nonionic, hydrophilic vinyl monomer with a water solubility of more than 100 g/I at 20° C., preferably selected from the group consisting of acrylamide, methacrylamide, hydroxyethyl acrylate and hydroxyethyl methacrylate,
k) optionally up to 5 wt % of one or more further monomers, different from monomers h), i) and j), and wherein the polyurethane and the poly(meth)acrylate are present in a weight ratio from 1:9 to 9:1, preferably from 1:5 to 5:1, or from 1:4 to 4:1, more preferred from 1:3 to 3:1, based on the total weight of the polymers.

In the text below, the designation "(meth)acryl . . . " and similar designations is used as an abbreviating notation for "acryl . . . or methacryl . . . ". The expression "Cx alkyl(meth)acrylate" encompasses alkyl acrylates and alkyl methacrylates having x C atoms in the alkyl group.

The term "aqueous carrier" means a solvent system consisting exclusively or predominantly (at least 50%, preferably at least 70%, at least 90% or more than 95% by weight of all solvents) of water.

The terms "polyurethane dispersion binder" and "poly (meth)acrylate dispersion binder" mean binder polymer which are dispersable in water and which are dispersed in the aqueous carrier. The poly(meth)acrylate dispersion binders are distinct from aqueous acrylic resin solutions which are sometimes used in inks as pigment wetting agents or as water soluble polymeric dispersants but which are no binders and have a content of acid monomers of typically more than 4 or 5 wt. % in order to achieve their water solubility.

Glass transition temperatures are determined by Differential Scanning calorimetric (ASTM D 3418-08, "midpoint temperature" of second heating curve, heating rate 20° C./min).

Since polymeric hydroxy compounds have a molecular weight distribution, an average molecular weight is calculated based on the measured hydroxyl value (OH value) and average functionality (number of hydroxyl groups per molecule):

Average molecular weight=(56.11*1000*Functionality)/OH value where 56.11 is the molecular weight of potassium hydroxide and 1000 is the number of milligrams in one gram of sample. Hydroxyl value is measured as described in DIN 53240-2:2007-11.

Preferably, the polyurethane is made of components comprising
a) 5 to 30% by weight of the at least one diisocyanate (a) which is selected from the group consisting of 1-isocyanato-3,5,5-trimethyl-5-isocyanatomethylcyclohexane (IPDI), tetramethylxylylene diisocyanate (TMXDI), hexamethylene diisocyanate (HDI), bis(4-isocyanatocyclohexyl) methane (HMDI) or mixtures thereof
b) 10 to 80%, or 20 to 80%, preferably 40 to 80% by weight of the at least one diol having number average molecular weight of from 500 to 5000 g/mol, which is selected from the group consisting of (b1) polyesterdiols made from at least one dicarboxylic acid of the formula HOOC—(CH2)y—COOH, where y is a number from 1 to 20, preferably an even number from 2 to 20, and at least one polyhydric alcohol selected from the group consisting of compounds of the formula HO—(CH2)x—OH, where x is a number from 1 to 20, and neopentyl glycol and mixtures thereof, and (b2) at least one polyetherdiol or mixtures of (b1) and (b2),
c) 1 to 20% by weight of the at least one monohydroxypoly(alkylene oxide) compound having a number average molecular weight of from 500 to 5000 g/mol,
d) 0 to 10%, or 0.1 to 5% by weight of at least one polyamine compound having at least three amino groups,
e) 0 to 10%, or 0.1 to 10%, or 0.1 to 5% by weight of at least one diamine having no acid groups,
f) 0.5 to 10%, or 0.5 to 5% by weight of at least one diamino acid compound, which is preferably selected from the group consisting of diamino carboxylic acid compounds and diamino sulfonic acid compounds, and preferably N-(2-aminoethyl)-2-aminoethane-sulfonic acid, N-(2-aminoethyl)-2-aminoethanecarboxylic acid and the corresponding alkali metal salts thereof
g) 0 to 20%, or 0.1 to 10% by weight of the optional one or more polyol compounds having a number average molecular weight of less than 500 g/mol, preferably from 60 to 490 g/mol.

The diisocyanates (a) are preferably used in amounts of 5 to 30% by weight, more preferred from 10 to 25% by weight. The polyisocyanates (a) are, in particular, diisocyanates $X(NCO)_2$, where X is an aliphatic hydrocarbon radical of 4 to 12 carbons, a cycloaliphatic hydrocarbon radical of 6 to 15 carbons or an aromatic hydrocarbon radical of 6 to 15 carbons or an araliphatic hydrocarbon radical of 7 to 15 carbons. Examples of such diisocyanates are tetramethylene diisocyanate, hexamethylene diisocyanate (HDI), dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of bis(4-isocyanatocyclohexyl)methane (HMDI, such as the trans/trans, the cis/cis and the cis/trans isomer), and mixtures of these compounds. Particularly important mixtures of these isocyanates are the mixtures of the respective structural isomers of diisocyanatotoluene and diisocyanato diphenylmethane, especially the mixture comprising 80 mol % 2,4-diisocyanatotoluene and 20 mol % 2,6-diisocyanatotoluene. In addition, the mixtures of aromatic isocyanates, such as 2,4-diisocyanatotoluene and/or 2,6-diisocyanatotoluene, with aliphatic or cycloaliphatic isocyanates, such as hexamethylene diisocyanate or IPDI, are particularly advantageous, the preferred proportion of aliphatic to aromatic isocyanates being from 4:1 to 1:4. In addition to the above mentioned isocyanates, other isocyanates which can be employed as compounds to synthesize the polyurethanes are those which carry not only the free isocyanate groups but also further, blocked isocyanate groups, examples being uretdione groups. Especially preferred are polyisocyanates (a) selected from the group consisting of 1-isocyanato-3,5,5-trimethyl-5-isocyanatomethylcyclohexane (IPDI), tetramethylxylylene diisocyanate (TMXDI), hexamethylene diisocyanate (HDI), bis(4-isocyanatocyclohexyl)methane (HMDI) or mixtures thereof.

The at least one diol (b) is preferably used in amounts of 10 to 80% by weight, more preferred from 20 to 70% by weight. The at least one diol (b) is preferably selected from the group consisting of (b1) polyesterdiols and (b2) polyetherdiols and mixtures thereof. When used in combination, the weight ratio of polyesterdiols (b1) and polyetherdiols (b2) is preferably from 1:3 to 3:1 more preferably from 1:2 to 2:1.

The polyesterdiols (b1) are, in particular, polyesterpolyols which are known, for example, from Ullmann's Encyklopädie der technischen Chemie, 4th Edition, Vol. 19, pp. 62 to 65. It is preferred to employ polyesterpolyols that are obtained by reacting dihydric alcohols with dibasic carboxylic acids. Instead of the free polycarboxylic acids it is also possible to use the corresponding polycarboxylic anhydrides or corresponding polycarboxylic esters of lower alcohols, or mixtures thereof, to prepare the polyesterpolyols. The polycarboxylic acids can be aliphatic, cycloaliphatic, araliphatic, aromatic or heterocyclic and can be unsubstituted or substituted (by halogen atoms, for example), and/or saturated or unsaturated. Examples are suberic, azelaic, phthalic and isophthalic acid, phthalic, tetrahydrophthalic, hexahydrophthalic, tetrachlorophthalic, endomethylenetetrahydrophthalic, glutaric and maleic anhydride, maleic acid, fumaric acid and dimeric fatty acids. Preference is given to dicarboxylic acids of the formula HOOC—(CH2)-y—COOH, where y is a number from 1 to 20, preferably an even number from 2 to 20, examples being succinic, adipic, sebacic and dodecanedicarboxylic acids.

Examples of suitable polyhydric alcohols for making the polyesterdiols (b1) are ethylene glycol, 1,2-propanediol, 1,3-propanediol, 1,3-butanediol, 1,4-butanediol, 1,4-butenediol, 1,4-butynediol, 1,5-pentanediol, neopentyl glycol, bis (hydroxymethyl)cyclohexanes such as 1,4-bis(hydroxymethyl)cyclohexane, 2-methyl-1,3-propanediol, methylpentanediols, and also diethylene glycol, triethylene glycol, tetraethylene glycol, polyethylene glycol, dipropylene glycol, polypropylene glycol, dibutylene glycol and polybutylene glycols. Preference is given to alcohols of the formula HO—(CH2)x-OH, where x is a number from 1 to 20, preferably an even number from 2 to 20. Examples of such alcohols are ethylene glycol, 1,4-butanediol, 1,6-hexanediol, 1,8-octanediol and 1,12-dodecanediol. Preference extends to neopentyl glycol.

Also suitable are polycarbonatediols, as can be obtained, for example, by reaction of phosgene with an excess of the low molecular mass alcohols cited above as structural components for the polyesterpolyols. Lactone-based polyesterdiols are also suitable, these being homopolymers or copolymers of lactones, preferably hydroxy-terminal adducts of lactones with suitable difunctional starter molecules. Suitable lactones are preferably those derived from compounds of the formula HO—(CH2)z-COOH, where z is from 1 to 20 and one hydrogen of a methylene unit can also be substituted by a C1-C4-alkyl. Examples are [epsilon]-caprolactone, [beta]-propiolactone, [gamma]-butyrolactone and/or methyl-[epsilon]-caprolactone, and mixtures thereof. Examples of suitable starter components are the low molecular mass dihydric alcohols cited above as structural components for the polyesterpolyols. The corresponding polymers of [epsilon]-caprolactone are particularly preferred. Lower polyesterdiols or polyetherdiols can also be employed as starters for preparing the lactone polymers. Instead of the polymers of lactones it is also possible to employ the corresponding, chemically equivalent polycondensates of the hydroxycarboxylic acids which correspond to the lactones.

Suitable polyetherdiols (b2) can in particular be obtained via polymerization of ethylene oxide, propylene oxide, butylene oxide, tetrahydrofuran, styrene oxide, or epichlorohydrin with itself, e.g. in the presence of $BF_3$, or via adduct-formation of said compounds optionally in a mixture or in succession, with starter components having reactive hydrogen atoms, for example alcohols or amines, e.g. water, ethylene glycol, propane-1,2-diol, propane-1,3-diol, 2,2-bis (4-hydroxy-phenyl)propane, or aniline. Examples of polyetherdiols are polypropylene oxide, polytetrahydrofuran with a molar mass of 240 to 5000 g/mol, and especially 500 to 4500 g/mol. Polytetrahydrofuran is a particularly preferred polyetherdiol as structural component for the polyurethanes. Polytetrahydrofuran diol (b2) is obtainable in particular by addition polymerization of tetrahydrofuran with itself, in the presence, for example, of BF3, or by addition reaction onto starter components containing reactive hydrogens, such as alcohols or amines, examples being water, ethylene glycol, 1,2-propanediol, 1,3-propanediol, 1,2-bis(4-hydroxydiphenyl)propane or aniline. Particular preference is given to polytetrahydrofuran having a number average molecular weight of from 500 to 5000 and, in particular, from 500 to 4500 or from 1000 to 3000 g/mol.

The at least one monofunctional compound (c) is a compound with either one isocyanate group or with one isocyanate-reactive functional group. Preferred isocyanate-functional groups are amino groups and hydroxy groups. A preferred compound (c) is a monohydroxy-poly(alkylene oxide) compound. The compound (c) is preferably used in amounts of 1 to 20% by weight, more preferably in amounts of from 4% to 15% weight or from 7 to 15 weight % of the polyurethane polymer. Suitable compounds (c) are alkanol started polyalkylene glycols. These compounds have an alkyl group at one terminal end and a hydroxy group at the other terminal end of the polymer. The alkanol has preferably 2 to 8 or 2 to 5 carbon atoms such as ethanol, propanol or butanol, preferably n-butanol. The alkylene group is for example ethylene, propylene or a mixture thereof, preferably ethylene. The general formula can be HO-(A-O)$_n$—R with A being an alkylene group as mentioned above, R being an alkyl group as mentioned above and n being a number from 20 to 65. The OH-number of the monohydroxy-poly(alkylene oxide) compound (c) is preferably from 10 to 250, or from 10 to 100 or from 15 to 56 mg KOH/g.

The components (b) and (c) together constitute preferably at least 75% of the weight of the polyurethane.

The at least one polyfunctional compound (d) having at least three NCO-groups or having at least three NCO-reactive groups is used in amounts of preferably 0 to 10%, or 0.1 to 5% or 1 to 7% by weight. NCO-reactive groups are for example amine groups or hydroxy groups. The polyfunctional compounds (d) can serve generally for crosslinking and preferably have 3 or more amino groups such as primary and/or secondary amino groups. Polyamines having 3 or more primary and/or secondary amino groups are employed in particular when crosslinking is to take place in the presence of water, since amines generally react more quickly with isocyanates than do alcohols or water. This is in many cases necessary when the desire is for aqueous dispersions of crosslinked polyurethanes, or polyurethanes of high molar weight. In such cases a procedure is followed in which prepolymers with isocyanate groups are prepared, are rapidly dispersed in water and then are subjected to crosslinking by adding compounds having 3 or more isocyanate-reactive amino groups. Amines suitable for this purpose are, in general, polyfunctional amines with a molar weight in the range from 32 to 500 g/mol, preferably from 60 to 300 g/mol, having at least 3 amino groups selected from the group consisting of primary and secondary amino groups. Examples are triamines such as diethylenetriamine or 1,8-diamino-4-aminomethyloctane. It is preferred to use mixtures of diamines and triamines, especially mixtures of isophoronediamine (IPDA) and diethylenetriamine (DETA). Further examples for compounds (d) are alcohols having a functionality of 3 or more which can be used to establish a certain degree of branching or crosslinking, such as trimethylolpropane, glycerol and sugars. Examples for isocyanates with a functionality of 3 or more are the isocyanurate or the biuret of hexamethylene diisocyanate.

The at least one diamine (e) having no acid groups is preferably used in amounts of 0 to 10% by weight or 0.1 to 10% by weight, more preferably in amounts of from 0.1 to 5% by weight. The diamine compounds (e) can serve generally for chain extension and typically have 2 primary and/or secondary amino groups. Diamines having 2 primary and/or secondary amino groups are employed in particular when chain extension is to take place in the presence of water, since amines generally react more quickly with isocyanates than do alcohols or water. In such cases a procedure is followed in which prepolymers with isocyanate groups are prepared, are rapidly dispersed in water and then are subjected to chain extension by adding compounds having two isocyanate-reactive amino groups. Amines suitable for this purpose are, in general, polyfunctional amines with a molar weight in the range from 32 to 500 g/mol, preferably from 60 to 300 g/mol, having two amino groups selected from the group consisting of primary and secondary amino groups. Examples are diamines such as diaminoethane, diaminopropanes, diaminobutanes, diaminohexanes, piperazine, 2,5-dimethylpiperazine, amino-3-aminomethyl-3,5,5-trimethyl-cyclohexane (isophoronediamine, IPDA), 4,4'-diaminodicyclo-hexylmethane, 1,4-diaminocyclohexane, aminoethylethanolamine, hydrazine, hydrazine hydrate. IPDA is especially preferred.

The compound (f) having at least one NCO-reactive group and at least one ionic or ionizable group can be for example a dihydroxy acid compound or a diamino acid compound. The compound (f) is used in amounts of 0 to 10% by weight, preferably in amounts of 0.5 to 10% by weight, more preferably in amounts of from 1 to 5% by weight. Suitable diamino acid compounds can be selected from the group consisting of diamino carboxylic acid compounds and diamino sulfonic acid compounds. Such compounds conform for example to the formula H2N—R1—NH—R2-X where R1 and R2 independently of one another are a C1-C6-alkanediyl, preferably ethylene, and X is COOH or SO3H. Particularly preferred compounds (f) are N-(2-aminoethyl)-2-aminoethane carboxylic acid and N-(2-aminoethyl)-2-aminoethane sulfonic acid and the corresponding alkali metal salts, Na being the particularly preferred counterion.

The hardness and the modulus of elasticity of the polyurethanes can be raised by employing low molecular mass polyol compounds (g) (preferably diols) having a molecular weight of less than 500 g/mol, e.g. from about 60 to 490 g/mol, preferably from 62 to 200 g/mol. The amount of low molecular weight polyols (g) is preferably 0 to 10% by weight, more preferably from 1 to 8% by weight. Compounds employed as polyols (g) are in particular the structural components of the short-chain alkanediols cited for the preparation of polyesterdiols, preference being given to the diols having 2 to 12 carbons, to the unbranched diols having 2 to 12 carbons and an even number of carbons, and to 1,5-pentanediol, 1,4-butanediol and neopentyl glycol.

Polyurethane binders having a particularly good profile of properties are obtained in particular when the monomers (a) employed comprise essentially only aliphatic diisocyanates, and/or cycloaliphatic diisocyanates; and when the monomer (b1) employed essentially comprises only polyesterdiols synthesized from the abovementioned aliphatic diols and diacids; and when component (f), comprises alkali metal salts of N-(2-aminoethyl)-2-aminoethane sulfonic acid and/ or N-(2-aminoethyl)-2-aminoethane carboxylic acid; and when component (d) is DETA and compound (e) is IPDA.

In the field of polyurethane chemistry it is generally known how the molecular weight of the polyurethanes can be adjusted by choosing the proportions of the co-reactive monomers and by the arithmetic mean of the number of reactive functional groups per molecule. The components and their respective molar amounts are normally chosen such that the ratio A:B, where A is the molar amount of isocyanate groups and B is the sum of the molar amount of the hydroxyls and the molar amount of the further functional groups which are able to react with isocyanates in an addition reaction, is from 0.5:1 to 2:1, preferably from 0.8:1 to 1.5:1 and, with particular preference, from 0.9:1 to 1.2:1. With very particular preference the ratio A:B is as close as possible to 1:1.

The components (a) to (f) employed carry on average usually from 1.5 to 2.5, preferably from 1.9 to 2.1 and, with particular preference, 2.0 isocyanate groups and/or functional groups which are able to react with isocyanates in an addition reaction.

The polyaddition of the structural components for the production of the polyurethane preferably takes place at reaction temperatures of up to 180° C., with preference up to 150° C. preferably from 70 to 150° C. at atmospheric pressure or under autogenous pressure. The production of polyurethanes and of aqueous polyurethane dispersions is known to the person skilled in the art. The polyurethanes preferably take the form of aqueous dispersions and are used in this form. The pH of the polymer dispersion is preferably adjusted to be above 5, in particular to be between 5.5 and 9.5.

The PU dispersions are usually prepared by one of the following methods. In the acetone process an ionic polyurethane is prepared from the components in a water-miscible solvent which boils at below 100° C. under atmospheric pressure. Water is added until a dispersion is formed in which water is the coherent phase. The prepolymer mixing process differs from the acetone process in that rather than a fully reacted (potentially) ionic polyurethane it is a prepolymer carrying isocyanate groups which is prepared first. In this case, the components are chosen such that the above-defined ratio A:B is greater than 1.0 to 3, preferably 1.05 to 1.5. The prepolymer is first dispersed in water and then crosslinked, possibly by reacting the isocyanate groups with amines which carry more than 2 isocyanate-reactive amino groups, or is chain extended with amines which carry 2 isocyanate-reactive amino groups. Chain extension also takes place when no amine is added. In this case, isocyanate groups are hydrolyzed to amino groups, which react with residual isocyanate groups of the prepolymers and so extend the chain. If a solvent has been used in preparing the polyurethane, it is usual to remove the majority of the solvent from the dispersion, for example by distillation under reduced pressure. The dispersions preferably have a solvent content of less than 10% by weight and are, with particular preference, free from solvents. The dispersions generally have a solids content of from 10 to 75, preferably from 20 to 65% by weight and a viscosity of from 10 to 500 mPas (measured at 20° C. and at a shear rate of 250 $s^{-1}$).

The polyacrylate dispersion binder has a glass transition temperature between −20 and +40° C., preferably from −10 to +35° C. and is prepared by aqueous emulsion polymerization of radically polymerizable monomers. The glass transition temperature may be determined in the form of what is called the "midpoint temperature" by means of differential scanning calorimetry (ASTM D 3418-08). The radically polymerizable monomers comprise h) at least one vinyl monomer selected from the group consisting of acrylates, methacrylates and styrene,
i) from 0.1 to 4 wt % of one or more vinyl monomers with an acid group, preferably (meth)acrylic acid,
j) optionally up to 5 wt % of one or more nonionic, hydrophilic vinyl monomer with a water solubility of >100 g/l at 20° C., preferably selected from the group consisting of acrylamide, methacrylamide, hydroxyethylacrylate and hydroxyethylmethacrylate, and k) optionally up to 5 wt % of one or more further monomers, different from monomers h), i) and j).

Vinyl monomers (h) are used in an amount of preferably at least 60% by weight, based on the total amount of vinyl monomers, and preferably comprise a mixture of at least one soft monomer (h1) in an amount of preferably from 25 to 75% by weight, based on the total amount of vinyl monomers and at least one hard monomer (h2) in an amount of preferably from 20 to 70% by weight, based on the total amount of vinyl monomers, wherein soft monomers are monomers having a glass transition temperature of below 0° C. when polymerized as homopolymers, preferably alkyl acrylates with 2 to 6 carbon atoms in the alkyl group, and hard monomers are monomers having a glass transition temperature of above 0° C. when polymerized as homopolymers, preferably methyl(meth)acrylate or styrene.

The acrylate polymer dispersions for use in accordance with the invention are dispersions of acrylate polymers in an aqueous medium. The aqueous medium may, for example, be exclusively water, or may alternatively be mixtures of water with a water-miscible solvent such as ethanol or isopropanol. It is preferred not to use organic solvents. The solids contents of the dispersions are preferably from 15 to 75 wt %, more preferably from 40 to 60 wt %. The solids content may be realized for example through corresponding adjustment to the monomer amounts and/or to the amount of water used in the emulsion polymerization. The average size of the polymer particles dispersed in the aqueous dispersion is preferably less than 400 nm, more particularly less than 300 nm. With particular preference the average particle size is between 60 and 250 nm. By average particle size here is meant the d50 of the particle size distribution—that is 50 wt % of the entire mass of all the particles have a diameter smaller than the d50. The particle size distribution can be determined in a known way using an analytical ultracentrifuge (W. Mächtle, Makromolekulare Chemie 185 (1984), pages 1025-1039) or Dynamic Light Scattering. The pH of the acrylate polymer dispersion is set preferably to more than 4, more particularly to a pH of between 5 and 9. The acrylate polymers are preferably prepared by emulsion polymerization and are obtainable by radical polymerization of ethylenically unsaturated compounds (monomers).

The acrylate polymer is composed preferably to an extent of at least 60 wt %, or at least 80 wt %, more preferably at least 90 wt % of monomers (h). The nature and amount of the monomers are preferably such that the glass transition temperature of the polymer prepared by emulsion polymerization is in the above-mentioned range. The monomers (h) are preferably selected from alkyl(meth)acrylates an styrene, in particular C1 to C20 alkyl (meth)acrylates and styrene, for example (meth)acrylic acid alkyl esters with a $C_1$-$C_{10}$ alkyl radical, such as methyl methacrylate, methyl acrylate, n-butyl acrylate, ethyl acrylate, and 2-ethylhexyl acrylate. In particular, mixtures of the (meth)acrylic acid alkyl esters are suitable as well. Preferred monomers (h) are $C_1$ to $C_{10}$ alkyl acrylates and $C_1$ to $C_{10}$ alkyl methacrylates, more particularly $C_1$ to $C_8$ alkyl acrylates and methacrylates, and vinylaromatics, especially styrene, and mixtures thereof. Especially preferred are methyl acrylate, methyl methacrylate, ethyl acrylate, n-butyl acrylate, n-hexyl acrylate, octyl acrylate, and 2-ethylhexyl acrylate, 2-propylheptyl acrylate, styrene, and also mixtures of these monomers. More particularly the polymers are composed to an extent of at least 60 wt %, more preferably at least 80 wt %, and very preferably at least 90 or at least 95 wt % of $C_1$ to $C_{10}$ alkyl (meth)acrylates.

Suitable soft monomers (h1) are for example ethyl acrylate, n-propyl acrylate, n-butyl acrylate, n-hexyl acrylate and 2-ethylhexyl acrylate. Suitable hard monomers (h2) are for example styrene, methyl acrylate, tert-butyl acrylate and the alkyl methacrylates with 1 to 4 C-atoms in the alkyl group such as methyl methacrylate, ethyl methacrylate, n-butyl methacrylate, isobutyl methacrylate, tert-butyl methacrylate.

The vinyl monomers with acid groups (i) can be used in amounts of up to 5 wt.-%, preferably 0.1 to 5 wt %, more preferably 0.2 to 4 wt % or 0.3 to 3 wt %, based on the total amount of monomers. Examples of acid monomers (i) are ethylenically unsaturated carboxylic acids, ethylenically unsaturated sulfonic acids, and vinylphosphonic acid. Ethylenically unsaturated carboxylic acids used are preferably alpha,beta-monoethylenically unsaturated monocarboxylic and dicarboxylic acids having 3 to 6 C atoms in the molecule. Examples thereof are acrylic acid, methacrylic acid, itaconic acid, maleic acid, fumaric acid, crotonic acid, vinylacetic acid, and vinyllactic acid. Examples of suitable ethylenically unsaturated sulfonic acids include vinylsulfonic acid, styrenesulfonic acid, acrylamidomethylpropanesulfonic acid, sulfopropyl acrylate, and sulfopropyl methacrylate. Preference is given to acrylic acid and methacrylic acid and a mixture thereof; acrylic acid is particularly preferred.

The nonionic, hydrophilic vinyl monomer (j) can be used in amounts of up to 5 wt %, preferably 0.1 to 5 wt %, more preferably 0.2 to 4 wt %. Monomers (j) are nonionic and have a water solubility of greater than 100 g/l at 20° C. Monomers (j) are preferably selected from the group consisting of acrylamide, methacrylamide, hydroxyethyl acrylate and hydroxyethyl methacrylate.

Besides monomers (h) to (j) the acrylate polymer may comprise further monomers (k), examples being vinyl esters of carboxylic acids having 1 to 20 C atoms, for example, vinyl laurate, vinyl stearate, vinyl propionate, Versatic acid vinyl esters, and vinyl acetate; vinylaromatic compounds for example vinyltoluene, alpha- and para-methylstyrene, alpha-butylstyrene, 4-n-butylstyrene, 4-n-decylstyrene; nitrile monomers such as acrylonitrile and methacrylonitrile; vinyl halides such as ethylenically unsaturated compounds substituted by chlorine, fluorine, or bromine, preferably vinyl chloride and vinylidene chloride; vinyl ethers such as those of alcohols comprising 1 to 4 C atoms, for example vinyl methyl ether or vinyl isobutyl ether; hydrocarbons having 4 to 8 C atoms and two olefinic double bonds such as butadiene, isoprene, and chloroprene, adhesion promoting monomers and crosslinking monomers. Examples for adhesion promoting monomers and crosslinking monomers are acetoacetoxyethyl methacrylate, acetoacetoxyethyl acrylate, ureidoethyl methacrylate (2-(Oxoimidazolidin)-1yl-ethyl-methacrylat), diacetone acrylamide (N-(1,1-Dimethyl-3-oxybutyl) acrylamide), glycidyl methacrylate (2,3-Epoxy-propyl methacrylate), glycidyl acrylate, N-methylol acrylamide and N-methylol methacyalamide. These further monomers, different from monomers (h) to (j) may be used in amounts of up to 10 wt % or up to 5 wt. %, preferably 0.1 to 10 wt. %, more preferably 0.2 to 5 wt %. The adhesion promoting monomers and crosslinking monomers are preferably used in amounts from 0 to 5 wt. %, e.g. from 0.1 to 5 wt. %. In one aspect of the invention no other vinyl monomers besides monomers (h)-(j) are used for preparing the acrylate polymer.

One particularly preferred acrylate polymer is composed of
h1) 25 to 75 wt % of at least one soft vinyl monomer selected from the group consisting of ethyl acrylate, n-butyl acrylate and 2-ethylhexyl acrylate,
h2) 20 to 70 wt % of at least one hard vinyl monomer selected from the group consisting of methyl acrylate, methyl methacrylate and styrene,
i) 0.1 to 5 wt % of (meth)acrylic acid,
j) 0 to 5 wt. % of one or more nonionic, hydrophilic vinyl monomer with a water solubility of more than 100 g/l at 20° C., selected from the group consisting of acrylamide, methacrylamide, hydroxyethylacrylate and hydroxyethylmethacrylate,
wherein the sum of monomers (h1) and (h2) are at least 80% by weight.

The acrylate polymers may be prepared by emulsion polymerization, the product then being an emulsion polymer. In the emulsion polymerization it is usual to use ionic and/or nonionic emulsifiers and/or protective colloids, and/or stabilizers, as interface-active compounds, in order to support the dispersing of the monomers in the aqueous medium. A comprehensive description of suitable protective colloids is found in Houben-Weyl, Methoden der organischen Chemie, volume XIV/1, Makromolekulare Stoffe [Macromolecular compounds], Georg-Thieme-Verlag, Stuttgart, 1961, pp. 411 to 420. Emulsifiers contemplated are anionic, cationic, and nonionic emulsifiers. As accompanying interface-active substances it is preferred to use exclusively emulsifiers, whose molecular weights, in contrast to the protective colloids, are usually below 2000 g/mol. Where mixtures of interface-active substances are used, the individual components must, of course, be compatible with one another, something which in case of doubt can be verified using a few preliminary experiments. Preference is given to using anionic and nonionic emulsifiers as interface-active substances. Suitable emulsifiers are, for example, ethoxylated $C_8$ to $C_{36}$ or $C_{12}$ to $C_{18}$ fatty alcohols having a degree of ethoxylation of 3 to 50 or of 4 to 30, ethoxylated mono-, di-, and tri-$C_4$ to $C_{12}$ or $C_4$- to $C_9$ alkylphenols having a degree of ethoxylation of 3 to 50, alkali metal salts of dialkyl esters of sulfosuccinic acid, alkali metal salts and ammonium salts of $C_8$ to $C_{12}$ alkyl sulfates, alkali metal salts and ammonium salts of $C_{12}$ to $C_{18}$ alkylsulfonic acids, and alkali metal salts and ammonium salts of $C_9$ to $C_{18}$ alkylarylsulfonic acids. Cationic emulsifiers are, for example, compounds having at least one amino group or ammonium group and at least one $C_8$-$C_{22}$ alkyl group.

In one aspect of the invention the acrylate polymer is polymerized in the presence of at least one anionic surfactant in an amount of preferably from 0.05 to 5 parts per 100 parts by weight of monomers.

Further suitable emulsifiers are compounds of the general formula

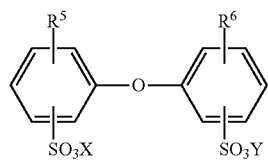

in which $R^5$ and $R^6$ are hydrogen or $C_4$ to $C_{14}$ alkyl and are not simultaneously hydrogen, and X and Y may be alkali metal ions and/or ammonium ions. Preferably, $R^5$ and $R^6$ are linear or branched alkyl radicals having 6 to 18 C atoms, or hydrogen, and more particularly having 6, 12, and 16 C atoms, with $R^5$ and $R^6$ not being both simultaneously hydrogen. X and Y are preferably sodium, potassium, or ammonium ions, with sodium being particularly preferred. Particularly advantageous are compounds in which X and Y are sodium, $R^5$ is a branched alkyl radical having 12 C atoms, and $R^6$ is hydrogen or $R^5$. Use is frequently made of technical mixtures which include a fraction of 50 to 90 wt % of the monoalkylated product, an example being Dowfax® 2A1. Suitable emulsifiers are also found in Houben-Weyl, Methoden der organischen Chemie, Volume 14/1, Makromolekulare Stoffe [Macromolecular compounds], Georg Thieme Verlag, Stuttgart, 1961, pages 192 to 208. Emulsifier trade names are, for example, Dowfax® 2 A1, Emulan® NP 50, Dextrol® OC 50, Emulgator 825, Emulgator 825 S, Emulan® OG, Texapon® NSO, Nekanil® 904 S, Lumiten® I-RA, Lumiten® E 3065, Disponil® FES 77, Lutensol® AT 18, Steinapol® VSL, Emulphor® NPS 25. Also suitable are copolymerizable emulsifiers which comprise a radically polymerizable, ethylenically unsaturated double bond, examples being reactive anionic emulsifiers such as Adeka® Resoap SR-10.

The emulsion polymerization takes place in general at 30 to 130° C., preferably at 50 to 95° C. or at 50 to less than 90° C. The polymerization medium may consist only of water, or of mixtures of water and liquids miscible therewith such as methanol. Preference is given to using just water. The emulsion polymerization may be carried out as a batch operation or in the form of a feed process, including staged or gradient regimes. Preference is given to the feed process, in which a portion of the polymerization batch is introduced as the initial charge and is heated to the polymerization temperature, polymerization is commenced, and the remainder of the polymerization batch is supplied to the polymerization zone, usually via a plurality of spatially separate feeds, of which one or more comprise the monomers in pure form or in emulsified form, the additions taking place continuously, in stages, or under a concentration of gradient, with the polymerization being maintained. For more effective setting of the particle size, for example, it is also possible in the polymerization to include a polymer seed in the initial charge.

For the emulsion polymerization it is possible to use the typical and known auxiliaries, such as water-soluble initiators and chain transfer agents, for example. Water-soluble initiators for the emulsion polymerization are, for example, ammonium salts and alkali metal salts of peroxydisulfuric acid, e.g., sodium peroxodisulfate, ammonium peroxodisulfate, hydrogen peroxide, or organic peroxides, e.g., tert-butyl hydroperoxide. Also suitable are what are called reduction-oxidation (redox) initiator systems. The redox initiator systems are composed of at least one usually inorganic reducing agent and one organic or inorganic oxidizing agent. The oxidizing component comprises, for example, the initiators already specified above for the emulsion polymerization. The reducing components comprise, for example, alkali metal salts of sulfurous acid, such as sodium sulfite, sodium hydrogensulfite, alkali metal salts of disulfurous acid such as sodium disulfite, bisulfite addition compounds of aliphatic aldehydes and ketones, such as acetone bisulfite, or reducing agents such as hydroxymethanesulfinic acid and the salts thereof, or ascorbic acid. The redox initiator systems can be used together with soluble metal compounds whose metallic component is able to occur in a plurality of valence states. Examples of typical redox initiator systems include ascorbic acid/iron(II) sulfate/sodium peroxydisulfate, tert-butyl hydroperoxide/sodium disulfite, tert-butyl hydroperoxide/Na-hydroxymethanesulfinic acid, or tert-butyl hydroperoxide/ascorbic acid. The individual components, the reducing component for example, may also be mixtures, an example being a mixture of the sodium salt of hydroxymethane sulfinic acid and sodium disulfite. The stated compounds are used usually in the form of aqueous solutions, with the lower concentration being determined by the amount of water that is acceptable in the dispersion, and the upper concentration by the solubility of the respective compound in water. In general the concentration is 0.1 to 30 wt %, preferably 0.5 to 20 wt %, more preferably 1.0 to 10 wt %, based on the solution. The amount of the initiators is generally 0.1 to 10 wt %, preferably 0.5 to 5 wt %, based on the monomers to be polymerized. It is also possible for two or more different initiators to be used for the emulsion polymerization. For the purpose of removing the residual monomers, it is typical for initiator to be added after the end of the actual emulsion polymerization as well.

In the polymerization it is possible to use chain transfer agents to regulate molecular weight, in amounts, for example, of 0 to 0.8 part by weight, based on 100 parts by weight of the monomers to be polymerized, thereby reducing the molar mass. Suitability is possessed, for example, by compounds having a thiol group such as tert-butyl mercaptane, thioglycolic esters, such as 2-ethylhexyl thioglycolate (EHTG), mercaptoethanol, mercaptopropyltrimethoxysilane, n-dodecyl mercaptan, or tert-dodecyl mercaptan (t-DMK). Preference is given to EHTG or t-DMK. It is additionally possible to use chain transfer agents without a thiol group, such as C6 to C20 hydrocarbons, for example, which form a pentadienyl radical when hydrogen is abstracted, an example being terpinolene. In one embodiment the emulsion polymer is prepared using 0.05 to 0.7 wt % or less than 0.4 wt %, based on the monomer amount, of at least one chain transfer agent to regulate molecular weight.

In one aspect of the invention the (lamination) printing ink is free of ammonia and volatile organic tertiary amines. The term volatile means compounds with boiling points below 100° C.

The (lamination) printing ink preferably comprises 8 to 60% by weight, preferably 15 to 50% by weight of the at least two binder, 3 to 30% by weight, preferably 6 to 30% by weight of pigments, 15 to 60% by weight, preferably 30 to 60% by weight of water and 0.1 to 5% by weight of additives such as surfactants, antifoam agents, and waxes.

The binders can preferably be exclusively a mixture of the polyurethane dispersion binder and the polyacrylate dispersion binder as defined herein without any binder different thereof. When different binder resins are used, they preferably do not exceed about 50 wt. % or 20 wt. % of the total amount of binder. The inks are preferably free of ammonia; volatile tertiary amines, residual isocyanate and tin.

The (lamination) printing ink of this invention may be used in either flexographic or gravure printing by simply making minor adjustments to the formulation concentrations. Thus, the component concentrations may be adjusted for use in flexography or gravure printing. For example, a gravure ink or a flexographic ink preferably comprises about 8 to 60 wt. % of the binder, about 3 to 30 wt. % of the pigment colorant and about 15 to 60 wt. % solvent or water. The ink preferably has a viscosity between about 15 seconds to 30 seconds, as measured in a #2 efflux cup. Efflux cup measurement is the conventional method for measuring ink viscosities and involves timing the flow of a calibrated quantity of ink through a calibrated orifice. The lower viscosity inks typically are used in gravure printing and the higher viscosity inks typically are used in flexographic printing. Thus, when the ink has a viscosity of about 28 seconds as measured in a #2 efflux cup, it is suitable for flexographic printing, and when the ink has a viscosity of about 18 seconds as measured in a #2 efflux cup, it is suitable for gravure printing.

The binders are film forming upon removal of the water or of the water/solvent mixture. The inks include a colorant in addition to the binder and solvent. The colorant is one or more pigment or possibly a combination of pigment and one or more dyes. The colorant may be organic or inorganic. The most common pigments include azo dyes (for example, Solvent Yellow 14, Dispersed Yellow 23, and Metanil Yellow), anthraquinone dyes (for example, Solvent Red 111, Dispersed Violet 1, Solvent Blue 56, and Solvent Orange 3), xanthene dyes (Solvent Green 4, Acid Red 52, Basic Red 1, and Solvent Orange 63), azine dyes (for example, Jet Black), and the like. Major usable organic pigments include diarylide yellow AAOT (for example, Pigment Yellow 14 CI #21095), diarylide yellow AAOA (for example, Pigment Yellow 12 CI #21090), Phthalocyanine Blue (for example, Pigment Blue 15), lithol red (for example, Pigment Red 52:1 CI #15860:1), toluidine red (for example, Pigment Red 22 CI #12315), dioxazine violet (for example, Pigment Violet 23 CI #51319), phthalocyanine green (for example, Pigment Green 7 CI #74260), phthalocyanine blue (for example, Pigment Blue 15 CI #74160), naphthoic acid red (for example, Pigment Red 48:2 CI #15865:2). Inorganic pigments include titanium dioxide (for example, Pigment White 6 CI #77891), carbon black (for example, Pigment Black 7 CI #77266), iron oxides (for example, red, yellow, and brown), ferric oxide black (for example, Pigment Black 11 CI #77499), chromium oxide (for example, green), ferric ammonium ferrocyanide (for example, blue), and the like. The colorant is not limited to the foregoing. Thus, the colorant may be any conventional organic or inorganic pigment such as Zinc Sulfide, Pigment White 6, Pigment Yellow 1, Pigment Yellow 3, Pigment Yellow 12, Pigment Yellow 13, Pigment Yellow 14, Pigment Yellow 17, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 114, Pigment Yellow 121, Pigment Yellow 126, Pigment Yellow 127, Pigment Yellow 136, Pigment Yellow 174, Pigment Yellow 176, Pigment Yellow 188, Pigment Orange 5, Pigment Orange 13, Pigment Orange 16, Pigment Orange 34, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 57, Pigment Red 112, Pigment Red 122, Pigment Red 170, Pigment Red 210, Pigment Red 238, Pigment Blue 15, Pigment Blue 15:1, Pigment Blue 15:2, Pigment Blue 15:3, Pigment Blue 15:4, Pigment Green 7, Pigment Green 36, Pigment Violet 19, Pigment Violet 23, Pigment Black 7 and the like.

The (lamination) printing inks may also contain the usual ink additives to adjust flow, surface tension, and gloss of a printed ink. Such additives typically are polymeric dispersants, surface active agents, waxes, or a combination thereof. These additives may function as leveling agents, wetting agents, fillers, dispersants, defrothers or deaerators, or additional adjuvants may be added to provide a specific function. The lamination printing inks may contain a polymeric dispersant when the colorant is a pigment to disperse the pigment during mixing and grinding operations in the solvent. All components of the ink may be blended together and ground to reduce the pigment particles to the desired size distribution, typically 10 microns or less, or alternatively the pigment and the polymeric dispersant can be premixed and ground in the solvent (the medium) to form a "base" which is subsequently blended with the remaining components of the ink composition. The ink components may be mixed in a high speed mixer until a slurry consistency is reached and then passed through a media mill until the pigment is reduced to 10 microns or smaller. The wide versatility of the inks of this invention allows them to be prepared without a polymeric dispersant, but preferably they are made with a polymeric dispersant for grinding in, for example, polyvinyl butyral or blending with, for instance, a nitrocellulose base or an acrylic resin solution. Thus, the ink of this invention may contain 0 to about 12 parts by weight of the polymeric dispersant. Other useful colorants, solvents and adjuvants can be identified by consulting The Printing Ink Manual.

The present invention further relates to the printed laminate obtained or obtainable by using the ink according to the invention for printing on at least a part of a surface of the laminate. The printed laminate is made preferably from at least two polymer films by laminating the films with a lamination adhesive wherein the ink resides between the laminated films. At least one of the polymer films on which surface the ink resides preferably comprises a material selected from polypropylene, polyethylene terephthalate, polyamide and low density polyethylene.

The present invention further relates to the method of making a printed laminate, which method comprises:
applying at least one lamination ink according to the invention to at least a part of a surface of a first polymer film by a roll printing process (such as gravure printing or flexographic printing) and laminating a printed or unprinted second polymer film to the ink-bearing surface of the first polymer film by use of an adhesive. The material of the first and/or the second polymer film is preferably selected from polypropylene, polyethylene terephthalate, polyamide and low density polyethylene.

Furthermore, the invention also relates to the use of a printing ink according to the invention for printing on flexible substrates, preferably on polymer films; or as lamination printing ink for making printed laminates. These laminates render high lamination bond strengths of preferably more than 1.5 N/15 mm and most preferably more than 2 N/15 mm before and after heat-seal.

Lamination can be carried out by procedures well known to a person skilled in the art. Laminates in general are obtained for example by an ink according to the invention to the surface of a plastic substrate. After drying, a coated substrate is obtained. Subsequently a lamination adhesive is used to fix a second plastic surface to the coated substrate. The plastic substrates are preferably polymer films, especially transparent polymer films or wherein at least one polymer film is transparent.

Differently colored inks of the invention are especially suited for multiple printing, i.e. a first colored printed ink layer is covered with at least one further, white or non-white colored ink layer.

Benefits of the inks of the invention are high compatibility of the binder with the pigments; good blocking behavior of the printed film before lamination; high lamination bond strength of the film laminates, also in case of multiple printing; high re-solubility of ink which has temporarily dried on printing rolls; organic solvent-free inks.

The invention is now illustrated by the following non-limiting examples.

EXAMPLES

Polyarylate Dispersions (PAD)
PAD1
Precharge a stirred 2 liter glass polymerization reactor with 331 g deionized water 6.25 g Disponil® LDBS 20 (sodium n-alkyl-(C10-C13) benzene sulphonate emulsifier), flush with Nitrogen and heat to 85° C. Quickly add a solution of 3 g Ammoniumperoxodisulfat and 1.25 g sodium hydrogen carbonate in 62 g demineralized water and hold for 5 min. Add during 110 min from a stirred addition tank an emulsion prepared from 110 g water, 56.3 g Disponil® LBDS 20, 290 g n-butylacrylate, 189 g methyl methacrylate, 1 g acrylic acid, and 20 g acetacetoxy ethyl acrylate. Keep for another 30 min at 85° C. Cool to 80° C. Add during 60 min as separate feeds 3 g o a 10% aqueous solution of t-butylhdroperoxid and 3.8 g of a 13% aqueous solution of sodium acetone bisulfite. Keep for another 30 min at 80° C. Cool to 35° C., adjust pH to 7.8 by adding required amount of 25% aqueous ammonia solution. Filter through 125 μm filter mesh.
Solids content by gravimetric determination: 47.8%
pH.: 7.8
Particles size 126 nm by dynamic light scattering (DLS)
Glas transition temperature (Tg) of a dried polymer dispersion film by Differential Scanning calorimetry (DSC): 0° C.
PAD2
Precharge a 2 liter polymerization reactor with 390 g deionized water and 9.1 g of a 30 nm polystyrene seed emulsion having a solids content of 30%, stabilized with 20 wt % solid/solid sodium dodecyl sulfate. Flash the reactor with nitrogen and heat to 80° C. Add 36 g of a 7 wt % aqueous solution of ammonium peroxodisulfate. Feed monomer mixture A, consisting of 87.5 g ethyl acrylate, 12.5 g acrylic acid and 0.6 g ethylhexyl thioglycolate as chain transfer agent during 45 min at 80° C. After 5 min hold time, start feeding monomer mixture B, consisting of 240 g methyl methacrylate and 240 g n-butyl acrylate during 3 h. During these 3 h, the temperature is raised from 80° C. to 95° C. 30 min after starting the feed of monomer mixture B, a 2 wt % aqueous ammonia solution is fed to the reactor during 2.5 h. After the end of mixture B and ammonia feed, 15 g of a 2 wt % aqueous ammonia solution and 5.7 g of a 7 wt % aqueous solution of sodium peroxodisulfate is added during 15 min. Then, a solution of 1 g sodium bisulfite in 10.8 g water is added in a shot and the polymerization mixture kept at 95° C. for 30 min. After cooling to 30° C., the dispersion is filtered using a 125 μm filter bag.
Solid content 48.9%,
pH=8.5
Particle size measured by Dynamic light scattering=156 nm
Tg of a dried film measured by DSC=13° C.
PAD3
Same procedure as example PAD2, with monomer mixture B consisting of 300 g ethyl acrylate and 100 g styrene.
Solid content 48.9%,
pH=7.5
Particle size measured by Dynamic light scattering=147 nm
Tg of a dried film measured by DSC=10° C.
PAD4
In a 2 l polymerization reactor equipped with an anchor stirrer, 363 g of demineralized water and 2.6 g of Disponil® LBDS20 are precharged and heated to 85° C. A solution of 2.5 g Ammonium Peroxodisulfate is added. After 5 min, a mixture of 250 g n-butyl acrylate, 175 g methyl methacrylate and 62.5 g styrene is added over 2 h. Parallel to this addition a mixture of 100 g demineralized water, 39 g Disponil® FES77 and 20 g of a 50 wt-% aqueous solution of acrylamide is added over 2 h while maintaining the temperature of the stirred reaction mixture at 85° C. After the addition, the mixture is stirred for 30 min at 85° C. and then cooled to 80° C. Over the course of 1 h, 3 g of a 10% solution of t-butyl hydroperoxide and 3.82 g of a 13% aqueous solution of Acetonbisulfite are added. The mixture is cooled to 35° C., neutralized to pH 8.5 by addition of 1.6 g of 25% aqueous solution of ammonia and filtered through 125 μm filter mesh.

pH 8.5
particle size by DLS: 133 nm,
Glass transition temperature (Tg) of dried film measured by DSC (midpoint of second heating curve) is 17° C.

PAD5 (Comparative; 5 wt. % Acrylic Acid)

Same procedure as PAD2, with monomer mixture A consisting of 75 g ethyl acrylate, 30 g acrylic acid and 0.6 g ethylhexyl thioglycolate and mixture B consisting of 240 g methyl methacrylate and 240 g n-butyl acrylate.

Solid content 49.1%,
pH=6.5
Particle size measured by Dynamic light scattering=282 nm
Tg of a dried film measured by DSC=17° C.

Polyurethan Dispersions (PUD)
Materials:
poly(ester)polyol: based on adipic acid, neopentylglycol, 1,6-hexanediol, OH number 56 mg KOH/g polymer.
Poly(tetrahydrofuran)diol: PolyTHF® 2000, OH number 57 mg KOH/g polymer, molecular weight 1950-2050 g/mol
methyl-started polyethylene glycol: desalted, OH number 28 mg KOH/g polymer
butanol-started polyethyleneglycol: OH number 28 mg KOH/g polymer, molecular weight 2158 g/mol

PUD1

200 g of polyester (based on adipic acid, neopentylglycol, 1,6-hexanediol, OH number=56 mg KOH/g polymer), 200 g of PolyTHF® 2000 and 78 g of a butanol-started polyethylene glycol (OH number 28 mg KOH/g polymer) are charged in the reaction vessel along with 0.2 g of bismuth neodecanoate. The mixture is heated at an internal temperature of 60° C. and a mixture of isophorone diisocyanate (46 g) and di(4,4'-isocyanatocyclohexyl)methane (54 g) is added. Acetone (48 g) is added and the mixture is heated to reflux. One hour and 30 min after the beginning of reflux, 1,4-butanediol (4.3 g) is added and the reaction is further stirred at reflux. 30 min after the addition of 1,4-butanediol the reaction mixture is diluted with acetone (468 g). At an internal temperature of 50° C., a 40% water solution of N-(2-aminoethyl)-2-aminoethane carboxylic acid sodium salt (27 g) is added over 5 min, and the mixture is stirred for 5 min. The reaction mixture is dispersed by addition of water (588 g) within 15 min. A 6.5% aqueous solution of diethylentriamine (92 g) is added within 10 min. A distillation under reduced pressure is performed for removal of acetone.

Solids content by gravimetric determination: 42.2%,
pH of 9.8
Particle size measured by DLS: 140 nm.

PUD2

Dispersion was produced in an analogous manner to PUD1. Monomer mixture:

| | |
|---|---|
| Polyester-polyol | 190.25 g |
| PolyTHF ® 2000 | 190.25 g |
| methyl-started polyethyleneglycol (OH number 28 mg KOH/g polymer) | 71 g |
| Bismuth neodecanoate | 0.25 g |
| Isophorone diisocyanate | 44.8 g |
| Di(4,4'-isocyanatocyclohexyl)methane | 53.3 g |
| 1,4-butanediol | 4.23 g |
| N-(2-aminoethyl)-2-aminoethane carboxylic acid sodium salt | 10.2 g |
| Diethylenetriamine | 5.9 g |

Solids: 43.2%
pH: 10
Particle size by DLS: 101 nm

PUD3

Dispersion was produced in an analogous manner to PUD1. Monomer mixture:

| | |
|---|---|
| Polyester-polyol | 435.3 g |
| Trimethylolpropan | 3.6 g |
| butanol-started polyethyleneglycol (OH number 28 mg KOH/g polymer) | 65.7 g |
| Bismuth neodecanoate | 0.25 g |
| Isophoronediisocyanate | 38.5 g |
| di(4,4'-isocyanatocyclohexyl)methane | 45.7 g |
| Diethylenetriamine | 5 g |

Solids: 47.3
pH: 9.0
particle size by DLS: 119 nm

PUD4

406 g of polyester (based on adipic acid, neopentylglycol, 1,6-hexanediol, OH number=56 mg KOH/g polymer), 74 g of a butanol-started polyethyleneglycol (OH number 28 mg KOH/g polymer), 4.05 g of Trimethylolpropan and 6.55 g dimethylol propionic acid are charged in the reaction vessel along with 0.25 g of bismuth neodecanoate. The mixture is heated at an internal temperature of 60° C. and a mixture of isophoronediisocyanate (43 g) and di(4,4'-isocyanato-cyclohexyl)methane (51.4 g) is added. Acetone (50 g) is added and the mixture is heated to reflux. Two hours after the beginning of reflux, the reaction mixture is diluted with acetone (482 g). At an internal temperature of 50° C., 2-Dimethylethanolamin (4.36 g) is added and with 5 g water over 11 min diluted. The reaction mixture is dispersed by addition of water (588 g) within 15 min. A 6.5% water solution of diethylentriamine (87 g) is added within 10 min. A distillation under reduced pressure is performed for removal of acetone.

Solids: 38%
pH: 9.2
particle size by DLS: 80 nm

PUD5

Dispersion was produced in an analogous manner to PUD1. Monomer mixture:

| | |
|---|---|
| Polyester-polyol | 400 g |
| butanol-started polyethyleneglycol (OH number 28 mg KOH/g polymer) | 17 g |
| Elastostab ® H02 (stabilizer) | 2.5 g |
| Cesium acetate | 0.025 g |
| Isophoronediisocyanate | 35.4 g |
| di(4,4'-isocyanatocyclohexyl)methane | 42.9 g |
| N-(2-aminoethyl)-2-aminoethane sulfonic acid sodium salt | 11.3 g |
| Isophoroneediamine | 1.8 g |
| Diethylentriamine | 3.9 g |

Solids: 39.7%
pH: 7.1
particle size by DLS: 220 nm

Blend Examples

Any combination of any polyurethane dispersions PUD1 to PUD5 with any of polyacrylate dispersion PAD 1 to PAD 4 can be used according to the invention for preparing ink compositions.

Blend Example 1 (50:50)

250.5 g of PAD1 and 302.3 g of PUD5 are blended in a stirred vessel and diluted with 47.2 g of deionized water and adjusted to the desired pH with 25 wt-% aqueous ammonia solution
solids 38.9%
pH 8.9

Blend Example 2 (50:50)

245.4 g of PAD2 and 283.7 g of PUD1 are blended in a stirred vessel, diluted with 70.9 g of deionized water and adjusted to the desired pH with 25 wt-% aqueous ammonia solution
Solids: 39.4%
pH: 8.6

Blend Example 3 (55/45)

269.9 g of PAD2 and 284.2 g of PUD4 are blended in a stirred vessel, diluted with 45.9 g of deionized water and adjusted to the desired pH with 25 wt-% aqueous ammonia solution
Solids: 40.0%
pH: 8.6

Example 4 (50/50)

243.4 g of PAD4 and 277.8 g of PUD2 are blended in a stirred vessel, diluted with 78.8 g of deionized water and adjusted to the desired pH with 25 wt-% aqueous ammonia solution
Solids: 39.3%
pH: 8.9

Example 5 (65/35)

319 g of PAD3 and 177.6 g of PUD3 are blended in a stirred vessel, diluted with 103.4 g of deionized water and adjusted to the desired pH with 25 wt-% aqueous ammonia solution
Solids: 39.3%
pH: 8.9

Comparative Example 1

A polyurethane dispersion was prepared according to the description of example 2 of WO2009/023520
Solids: 33.9%
pH: 8.8
particle size by DLS: 108 nm

Comparative Example 2 (50/50)

244.4 g of PAD5 (comparative) and 283.7 g of PUD1 are blended in a stirred vessel, diluted with 71.9 g of deionized water and adjusted to the desired pH with 25 wt-% aqueous ammonia solution
Solids: 39.3%
pH: 8.7

Preparation and Testing of Inks:
Ink Preparation:

A cyan lamination ink is prepared, upon blending 30 parts by weight of a resin-based pigment concentrate consisting of 40 wt % organic pigment PB15.3, 10% dispersing resin Joncryl® HPD96, 0.5% antifoam agent (Tegofoam® 810) and 48.5% water with 70 parts of the ink binder of the invention.

A white lamination ink is prepared, upon blending parts of a resin-free pigment concentrate consisting of 75% titanium dioxide (Sachtleben RDI/S), 3% surfactant (Tego® Dispers 750W), 0.5% antifoam (Tegofoam® 810) and 21.5% water with 60 parts of the ink binder of the invention.

Viscosity of the ink is measured direct after preparation of the ink, after two days at room temperature (20° C.). Ink is diluted with water to print viscosity (maximum 20-25 sec flow time in DIN4 cup) and is printed on a polyester film.

| Ink Binder | Viscosity White Ink Initial DIN cup 4 [s] | Viscosity White Ink after 2 d DIN cup 4 [s] | Viscosity Cyan ink Initial DIN cup 4 [s] | Viscosity Cyan ink After 2 d DIN cup 4 [s] |
|---|---|---|---|---|
| Example 1 | 19 | 17 | 29 | 25 |
| Example 2 | 18 | 17 | 20 | 18 |
| Example 3 | 19 | 19 | 23 | 19 |
| Example 4 | 18 | 17 | 19 | 18 |
| Example 5 | 18 | 18 | 19 | 19 |
| Comparative Example 1 | 19 | 15 | 48 | 67 |
| Comparative Example 2 | 77 | 60 | 58 | 46 |

Ink Application:

Ink was applied on chemically treated polyester film (Mylar® 813), using a wire-bar 0 (4 µm wet ink). Coloured Inks are applied in one layer for block and resolubility testing or in two layers for lamination testing. White inks are applied in one layer on polyester for blocking and resolubility or as 3rd layer on top of two layers of coloured ink for lamination testing.

For one-layer print: put the printed substrate in an air circulated oven for 10 sec at 60° C. air temperature, then leave the print for 1 h at room temperature before laminating it to the secondary film or testing e.g. blocking resistance.

For two-layers print: print the first colour layer, dry 10 sec at 60° C. in an air circulated oven, print the second layer of white ink, dry 10 sec at 60° C. and leave the print for 1 h at room temperature, before laminating it to the secondary film.

Test of Ink Resolubility

Ink is applied onto corona treated OPP using a wire-bar 1 (6 µm wet coating weight) and then left to dry under different drying conditions:
  a) Leave for 1 min at room temperature
  b) Leave for 5 min at room temperature
  c) Leave for 10 min at room temperature
  d) Leave for 1 min in an air circulated oven at 60° C.

After drying, a droplet of ink is put on the print and subsequently wiped off. The amount of ink removed from the original print is judged as a measure of the ability of the ink to redissolve itself, after it has been dried.

| Ink Binder | White ink After 10 min at RT | Cyan Ink After 10 min at RT |
|---|---|---|
| Example 1 | + | + |
| Example 2 | + | + |
| Example 3 | ++ | + |
| Example 4 | o | o |
| Example 5 | + | + |

-continued

| Ink Binder | White ink After 10 min at RT | Cyan Ink After 10 min at RT |
|---|---|---|
| Comparative Example 1 | -- | - |
| Comparative Example 2 | ++ | ++ |

Resolubility grades: ++ = very good, + = good, o = ok, - = poor, -- = very poor

Preparation of Printed Laminates:

In order to test the lamination bond strengths, the prints on chemically treated PET were laminated to standard LDPE (Low-density Polyethylene) with a 2-component polyurethane lamination adhesive to give PET//LDPE laminates.

Preparation of the 2 component polyurethane lamination adhesive:

Liofol® Hardener UR6080: 8.0 weight parts (obtained from Henkel Industrial Adhesives)
Liofol® UR7780: 20.0 weight parts (obtained from Henkel Industrial Adhesives)
Ethyl acetate: 20.0 weight parts (solvent for ease of application)

The freshly prepared adhesive is applied (using wire bar 1, 6 μm wet) to the secondary (unprinted) film at a coating weight of 2.5 g/m² (dry), and subsequently dried in the oven for 10 s at 60° C. to evaporate the solvent. The printed films are next carefully applied with the printed side to the adhesive side of the secondary films, thereby avoiding creation of air bubbles in the laminate, to give PET//LDPE laminate structures. Firmly squeeze the laminated construction, by using a 10 kg roller. The resulting laminates are stored for 3 days under pressure (ca. 0.25 kg/cm²), in order to allow the adhesive to cure.

Test of Lamination Bond Strength (LBS)

For measurement of lamination bond strength (=force needed to peel the laminate open), a strip of 15 mm width is cut from the cured laminate and bond strength is measured using a Lloyd Instruments tensile tester. Measurement is done at a speed of 150 mm/min. During the measurement, the laminated strip should be kept under a 90° angle against the film clamps. This test is repeated after the laminated strip has been heat-sealed at 140° C. with 400 N for 1 s using a Brugger heat sealer, in order to simulate heat-seal process. Lamination bond strength is reported in Newton per 15 mm [N/15 mm].

| Ink Binder | LBS a of printed laminate with two layers of blue ink [N/15 mm] | LBS of printed laminate with two layers of blue ink plus one layer of white ink [N/15 mm] |
|---|---|---|
| Example 1 | 2.2 | 1.8 |
| Example 2 | 3.0 | 2.4 |
| Example 3 | 2.1 | 2.0 |
| Example 4 | DT | 2.2 |
| Example 5 | 2.3 | 1.9 |
| Comparative Example 1 | 0.7 | 0.5 |
| Comparative Example 2 | 0.9 | 0.7 |

DT: direct tear of the laminate, i.e. very high lamination bond strength, higher than material strength; due to tearing it is not possible to determine a LBS value, The examples of the invention have a lamination bond strength of more than 1 N/15 mm, preferably more than 1.5 N/15 mm.

Test of Blocking Resistance:

Diluted ink (diluted to a viscosity of 20-25 sec in DIN4 cup) will be printed on PET film. Coating weight applied: 1.0 g/m² for colour ink and 1.5 g/m² for white ink. Print will be dried in an oven: 10 sec at 60° C. After drying, a second unprinted film will be placed on top of the printed film, with the backside of the second film facing the printed side of the first printed film. Films will be placed in a Specac laboratory press and will be blocked at 5 tons/30° C./24 hrs (representing 65 kg/cm²). After removing the samples from the blocking tester, the unprinted layer film will be removed from the printed layer, and the tendency of the unprinted film to adhere to the printed film ("blocking") will be judged visually and reported as "Release" (tackiness) and "Damage" (ink transfer to the unprinted film). Typical example of blocking resistance measurement results are reported below. The values go from 1 (very bad, blocking ink) to 5 (very good, blocking-free ink). Release values of 3 or higher indicate acceptable performance.

| Ink Binder | Bock test results White on 813 | | Blocking test Cyan on 813 | |
|---|---|---|---|---|
| | Release | Damage | Release | Damage |
| Example 1 | 3.5 | 5 | 5 | 5 |
| Example 2 | 3 | 5 | 4.5 | 5 |
| Example 3 | 3.5 | 5 | 4 | 5 |
| Example 4 | 3.5 | 5 | 4 | 5 |
| Example 5 | 3 | 5 | 3.5 | 5 |
| Comparative Example 1 | 5/4.5 | 5 | 4.5 | 5 |
| Comparative Example 2 | 5 | 5 | 5 | 5 |

While comparative example 1 shows good blocking resistance, the ink resolubility and the lamination bond strength are poor.

While comparative example 2 shows good blocking resistance and good ink resolubility, the lamination bond strength is poor.

Inventive examples 1 to 5 show an improved balance of properties by having good or at least acceptable ink resolubilities, good lamination bond strengths and acceptable blocking resistance.

The invention claimed is:

1. A water-based printing ink comprising at least two binders, at least one pigment, and an aqueous carrier, wherein at least one first binder of the at least two binders is a polyurethane dispersion binder and at least one second binder of the at least two binders is a poly(meth)acrylate dispersion binder,
   wherein the polyurethane dispersion binder is made of components comprising:
     a) at least one diisocyanate;
     b) at least one diol having number average molecular weight of from 500 to 5000 g/mol; and
     c) at least one mono-hydroxy functional compound having a number average molecular weight of from 500 to 5000 g/mol; and
   wherein the poly(meth)acrylate dispersion binder has a glass transition temperature between −20 and +40° C. and is prepared by polymerization of components comprising:
     d) at least one vinyl monomer selected from the group consisting of: acrylates, methacrylates, and styrene; and
     e) 0.1 to 4 wt % of one or more vinyl monomers with an acid group; and
   wherein the polyurethane dispersion binder and the poly(meth)acrylate dispersion binder are present in a weight ratio from 1:9 to 9:1.

2. The water-based printing ink according to claim 1, wherein the component (a) is selected from the group consisting of: 1-isocyanato-3,5,5-trimethyl-5-isocyanatomethylcyclohexane (IPDI), tetramethylxylylene diisocyanate (TMXDI), hexamethylene diisocyanate (HDI), bis(4-isocyanatocyclohexyl)methane (HMDI), and mixtures thereof.

3. The water-based printing ink according to claim 1, wherein the component (c) is at least one monohydroxy-poly(alkylene oxide) compound having a number average molecular weight of from 500 to 5000 g/mol, wherein an alkylene of the at least one monohydroxy-poly(alkylene oxide) compound is at least one of ethylene and propylene.

4. The water-based printing ink according to claim 3, wherein the polyurethane dispersion binder comprises component (c) in an amount from 4% to 15% by weight based on weight of the polyurethane dispersion binder.

5. The water-based printing ink according to claim 1, wherein the polyurethane dispersion binder comprises components (b) and (c) together in an amount of at least 75% by weight based on weight of the polyurethane dispersion binder.

6. The water-based printing ink according to claim 1, wherein the component (b) is selected from the group consisting of:
(b1) polyesterdiols comprising at least one dicarboxylic acid of the formula HOOC—(CH2)y—COOH, wherein y is a number from 1 to 20, and at least one polyhydric alcohol selected from the group consisting of: compounds of the formula HO—(CH2)x—OH, wherein x is a number from 1 to 20, neopentyl glycol, and mixtures thereof,
(b2) at least one polyetherdiol, and
mixtures of (b1) and (b2).

7. The water-based printing ink according to claim 1, wherein the polyurethane dispersion binder further comprises a component (d3) comprising at least one polyfunctional compound comprising of at least three NCO—groups or at least three NCO-reactive groups.

8. The water-based printing ink according to claim 1, wherein the polyurethane dispersion binder further comprises a component (f) comprising at least one NCO-reactive group and at least one of an ionic group and an ionizable group, and wherein the at least one component (f) is a diamino acid compound, and wherein the diamino acid is selected from the group consisting of: diamino carboxylic acid compounds, diamino sulfonic acid compounds, N-(2-aminoethyl)-2-aminoethane-sulfonic acid, N-(2-aminoethyl)-2-aminoethanecarboxylic acid, and corresponding alkali metal salts of N-(2-aminoethyl)-2-aminoethane-sulfonic acid and N-(2-aminoethyl)-2-aminoethanecarboxylic acid.

9. The water-based printing ink according to claim 1, wherein the polyurethane dispersion binder comprises:
5 to 30% by weight of the component (a), which is selected from the group consisting of: 1-isocyanato-3,5,5-trimethyl-5-isocyanatomethylcyclohexane(IPDI), tetramethylxylylene diisocyanate (TMXDI), hexamethylene diisocyanate (HDI), bis(4-isocyanatocyclohexyl)methane (HMDI), and mixtures thereof;
10 to 80% by weight of the component (b) which is selected from the group consisting of: (b1) polyesterdiols made from at least one dicarboxylic acid of the formula HOOC—(CH2)y—COOH, where y is a number from 1 to 20, and at least one polyhydric alcohol selected from the group consisting of compounds of the formula HO—(CH2)x—OH, where x is a number from 1 to 20, and neopentyl glycol, and mixtures thereof, (b2) at least one polyetherdiol, and mixtures of (b1) and (b2);
1 to 20% by weight of the component (c);
0 to 10% by weight of at least one polyamine compound having at least three amino groups;
0 to 10% by weight of at least one diamine having no acid groups
0.5 to 10% by weight of at least one diamino acid compound selected from the group consisting of diamino carboxylic acid compounds, diamino sulfonic acid compounds, N-(2-aminoethyl)-2-aminoethane-sulfonic acid, N-(2-aminoethyl)-2-aminoethanecarboxylic acid, and corresponding alkali metal salts of N-(2-aminoethyl)-2-aminoethane-sulfonic acid and N-(2-aminoethyl)-2-aminoethanecarboxylic acid; and
0 to 20% by weight of one or more polyol compounds having a number average molecular weight of less than 500 g/mol.

10. The water-based printing ink according to claim 1, wherein the water-based printing ink comprises 8 to 60% by weight of the at least two binders, 3 to 30% by weight of pigments, 15 to 60% of water, and 0.1 to 5% by weight of additives selected from the group consisting of surfactants, antifoam agents, and waxes.

11. The water-based printing ink according to claim 1, wherein the poly(meth)acrylate dispersion binder is polymerized in the presence of at least one anionic surfactant in an amount of from 0.05 to 5 parts per 100 parts by weight of monomers.

12. The water-based printing ink according to claim 1, wherein the poly(meth)acrylate dispersion binder comprises the at least one vinyl monomer (d) in an amount of at least 60% by weight, based on weight of the total amount of vinyl monomers of the poly(meth)acrylate and vinyl monomer (d) comprises a mixture of at least one soft monomer (d1) comprising 25 to 75% by weight, based on weight of the total amount of vinyl monomers of the poly(meth)acrylate and at least one hard monomer (d2) comprising 20 to 70% by weight, based on weight of the total amount of vinyl monomers of the poly(meth)acrylate, wherein soft monomers are monomers having a glass transition temperature of below 0° C. when polymerized as homopolymers, and hard monomers are monomers having a glass transition temperature of above 0° C. when polymerized as homopolymers.

13. The water-based printing ink according to claim 1, wherein the poly(meth)acrylate dispersion binder is made of components comprising:
(d1) 25 to 75 wt % of at least one soft vinyl monomer selected from the group consisting of: ethyl acrylate, n-butyl acrylate, and 2-ethylhexyl acrylate;
d2) 20 to 70 wt % of at least one hard vinyl monomer selected from the group consisting of: methyl acrylate, methyl methacrylate, and styrene;
the component (e) further comprising 0.5 to 4 wt % of (meth)acrylic acid; and
(f) 0 to 5 wt. % of one or more nonionic, hydrophilic vinyl monomers with a water solubility of more than 100 g/L at 20° C. and selected from the group consisting of: acrylamide, methacrylamide, hydroxyethylacrylate, and hydroxyethylmethacrylate;
wherein the sum of weight percentages of monomers (d1) and (d2) is at least 80% by weight.

14. The water-based printing ink according to claim 7, wherein the component (d3) is a triamine compound.

15. A printed laminate printed with the water-based printing ink of claim 1 on at least a part of a surface of the printed laminate.

16. The printed laminate of claim 15, wherein the printed laminate comprises at least two polymer films, wherein the at least two polymer films are laminated with a lamination adhesive, and wherein the water-based printing ink is disposed between the at least two laminated polymer films.

17. The printed laminate of claim 16, wherein at least one of the at least two polymer films comprises a material selected from the group consisting of: polypropylene, polyethylene terephthalate, polyamide, and low density polyethylene.

18. A method of making a printed laminate, the method comprising:
  applying at least one lamination ink including a water-based printing ink as defined in claim 1 to at least a part of a surface of a first polymer film by a roll printing process; and
  laminating a printed or unprinted second polymer film to the lamination ink-bearing surface of the first polymer film by use of an adhesive.

19. The method of claim 18, wherein the material of at least one of the first and the second polymer film is selected from the group consisting of: polypropylene, polyethylene terephthalate, polyamide, and low density polyethylene.

20. A method of using the water-based printing ink according to claim 1 for one of printing on flexible substrates and as lamination printing ink for making printed laminates.

* * * * *